3,616,759
PROPELLANT COMPRISING NITROCELLULOSE
BONDED WITH NITROMETHANE
Rudolf Meyr, Munich, Eberhard Häussermann, Waldkraiburg, and Peter Semmler, Ebersberg, Germany, assignors to Nitrochemie G.m.b.H., Muhldorf, Upper Bavaria, Germany
Filed Jan. 7, 1966, Ser. No. 520,302
Claims priority, application Germany, Jan. 7, 1965,
N 26,044
Int. Cl. F42b 1/00, 1/02
U.S. Cl. 102—100                                 8 Claims

ABSTRACT OF THE DISCLOSURE

A composite solid propellant body which upon combustion will not form a pressure drop in the zone of adhesion between the individual bodies of the composite body, consisting of a plurality of solid propellant bodies, each of which consists of an explosive composition based on the combination of nitrocellulose and polyalcohol nitrate and which individual bodies are adhered to each other by means of nitromethane as the sole or essential constituent of an adhesive material.

---

Figure 1:
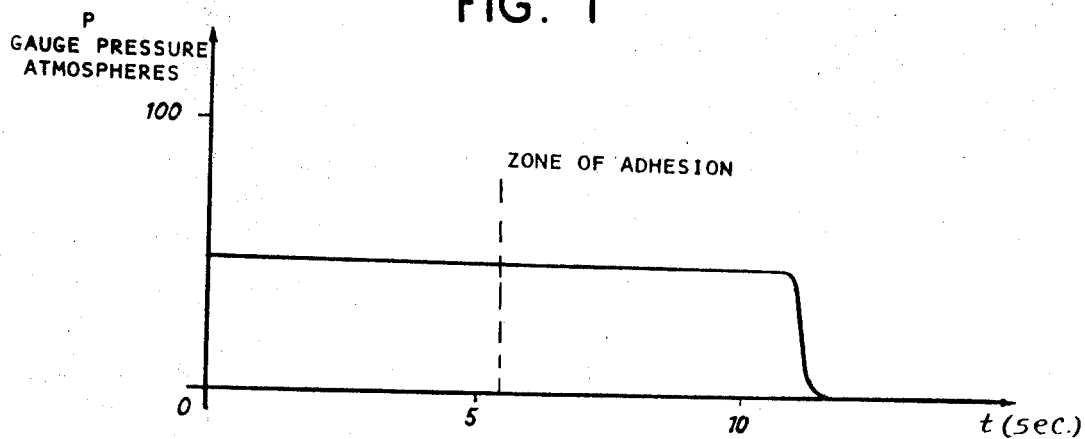

The present invention relates to solid composite propellant bodies, and more particularly to composite propellant bodies consisting essentially of a propellant composition based on nitrocellulose and a polyalcohol nitrate, more specifically nitroglycerin.

It happens frequently that compressed solid propellant charges cannot be produced in the desired final shape and/or dimensions. In such cases it becomes necessary to adhere to each other two or more compressed solid propellant bodies so as to form thereof a composite propellant body of the desired shape and dimensions.

However, certain difficulties were encountered in adhesively adhering individual solid propellant bodies of the type based on nitrocellulose-polyalcohol nitrate to each other.

It has been proposed to adhere such individual propellant bodies to each other by utilizing acetone or nitrocellulose dissolved in acetone as the adhesive composition.

However, it has been found that composite propellant bodies formed of individual propellant bodies which are adhered to each other with acetone, or nitrocellulose dissolved in acetone, do not show sufficient adhesive strength, particularly when exposed to elevated temperatures.

Furthermore, it has been found that in the zone of adhesion of such composite propellant bodies a considerable pressure drop, possibly up to 30%, occurs upon firing of the composite propellant body, and the ballistic properties are unfavorably affected. It has been found that the presence of acetone causes changes in the propellant composition in the zone of adhesion which result in combustion characteristics which can no longer be effectively controlled.

It is therefore an object of the present invention to overcome the above-discussed difficulties and disadvantages.

It is a further object of the present invention to provide a composite propellant body based on a nitrocellulose-polyalcohol nitrate or nitroglycerin explosive composition wherein the individual portions of the composite propellant body firmly adhere to each other and the firing and combustion characteristics of the composite propellant body remain substantially unaffected by the adhesive used for adhering the individual portions of the composite propellant body to each other.

Other objects and advantages of the present invention will become apparent from further reading of the description and of the appended claims.

With the above and other objects in view, the present invention contemplates a composite solid propellant body, comprising, in combination, a plurality of solid propellant bodies located adjacent each other, each of the propellant bodies consisting essentially of an explosive composition based on the combination of nitrocellulose and a polyalcohol nitrate, and an adhesive material consisting essentially of nitromethane interposed between and firmly adhering the propellant bodies to each other.

It has been found in accordance with the present invention that an effective adherence of the individual propellant bodies to each other can be accomplished by utilizing nitromethane or a mixture of nitromethane with the material of the propellant body, as the adhesive agent.

It is achieved thereby that the individual bodies of the composite propellant body will firmly adhere to each other and, surprisingly, it will also be achieved that upon firing and combustion of the composite propellant body the fact that the same is composed of individual propellant bodies with an adhesive interposed therebetween will not cause a pressure drop in the zone of adhesion.

It is possible, in accordance with the present invention, as desired to adhere to each other individual propellant bodies of the same or of different compositions without impeding the technological properties of the same.

It is particularly advantageous to use as the interposed adhesive a mixture of nitromethane and the material of the propellant bodies. Preferably, a stiff paste is formed of the finely comminuted propellant composition and nitromethane. By using as the finely comminuted propellant of the adhesive varying propellant compositions, it is possible to obtain the most advantageous adhesive composition for any given types of propellant bodies which are to be adhered to each other.

The term "propellant bodies" in the context of this application is meant to denote solid propellant bodies formed of a composition based on nitrocellulose-polyalcohol nitrate, whereby the polyalcohol nitrate frequently will be nitroglycerin.

The use as an adhesive of a mixture of nitromethane and comminuted propellant bodies is particularly advantageous if the individual propellant bodies possess a degree of resiliency such that it is difficult to form by cutting or the like planar surfaces thereon which, when attached to each other with the interposition of nitromethane alone would give perfect and continuous contact between the adhesive propellant bodies. In such cases, namely by adhering propellant bodies of considerable resiliency to each other, the use of nitromethane alone as an adhesive may lead to the formation of cavities in the zone of adhesion of the composite propellant body which, upon firing, may cause an, of course highly undesirable, explosive fragmentation of the composite propellant body.

When, however, nitromethane is replaced by a paste formed of nitromethane and finely comminuted propellant charge, such cavities between the adjacent faces of the individual propellant bodies of the composite propellant body will be filled with the paste, and firing and combustion will proceed unimpeded in the desired manner.

Figure 2:
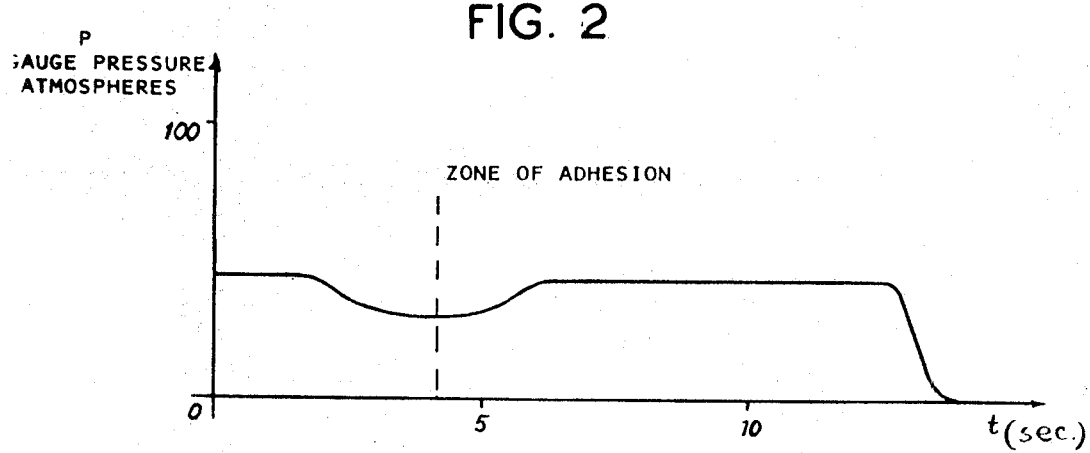
Figure 3:
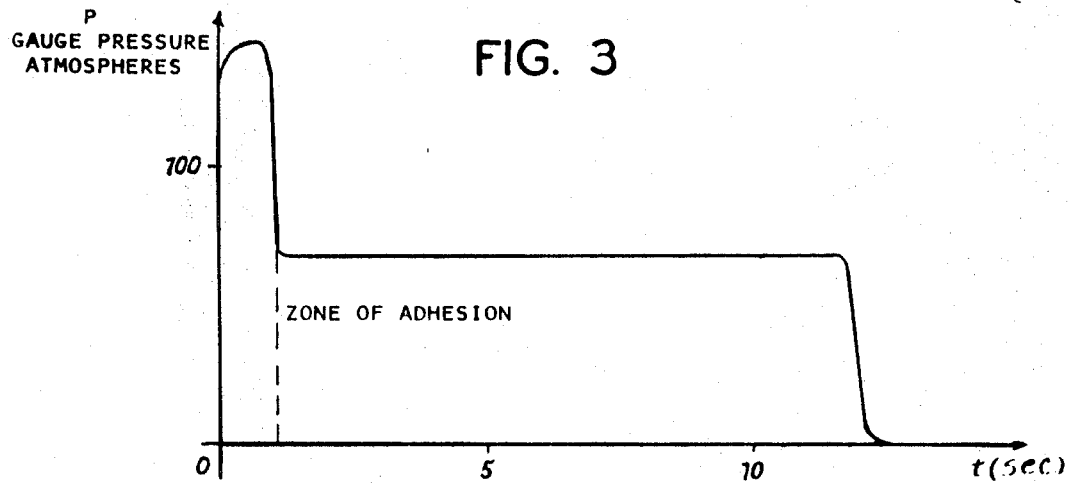

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which FIGS. 1–3 are pressure-time diagrams of the firing of various composite propellant bodies, as will be described in detail in connection with the examples below.

The following examples are given as illustrative only without, however, limiting the invention to the specific details of the examples.

EXAMPLE 1

The front faces of two cylindrical propellant bodies, both formed of the same explosive composition based on nitrocellulose-nitroglycerin are coated with nitromethane and then pressed against each other.

Upon firing it is found, as illustrated in FIG. 1, that there is no pressure reduction in the zone of adhesion between the two individual porpellant bodies.

In contrast thereto, if by otherwise proceeding in the same manner the nitromethane is replaced by a solution of nitrocellulose in acetone, a very significant pressure drop will be found in the zone of adhesion or in the vicinity of the plane of adhesion, as illustrated in FIG. 2.

EXAMPLE 2

A front face of a cylindrical POL body is coated with a stiff paste consisting of a finely comminuted POL propellant material and nitromethane, and is then pressed against a front face of a cylindrical propellant body of the same POL composition.

Upon firing, the pressure-time diagram shows the same uninterrupted horizontal extension of the pressure curve as illustrated in FIG. 1.

EXAMPLE 3

Two cylindrical propellant bodies consisting of conventional POL material with, however, different chemical and ballistic properties which hereinbelow will be described as propellant body I and propellant body II are adhered to each other under interposition of an adhesive mass consisting of a mixture of three parts nitromethane and one part of the material of propellant body I. The paste is applied to one of the front faces of the two bodies which are to be adhered to each other as a layer having a thickness of about 2 mm. and thereafter both propellant bodies, with the paste interposed therebetween, are pressed against each other.

A composite propellant body of this type is used for instance as the starting charge and sustaining charge in a propellant plant, whereby it is necessary that the changes in pressure and thrust conform to the ballistic requirements and are not influenced by the manner in which the two propellant bodies are adhered to each other or by the adhesive material used for this purpose.

EXAMPLE 4

A cylindrical propellant body I and a cylindrical propellant body II are adhered to each other by means of an adhesive mass consisting of a stiff paste composed of a mixture of two parts of nitromethane and one part of a finely comminuted mixture of equal proportions of the material of propellant body I and propellant body II.

The adhesive mass is applied in the form of a layer having a thickness of about 2 mm. to the front faces of the two propellant bodies which are to be adhered to each other and thereafter the two propellant bodies are pressed against each other.

EXAMPLE 5

A cylindrical propellant body I and a cylindrical propellant body II are adhered to each other under interposition of a stiff paste consisting of four parts nitromethane and one part of finely comminuted material of the composition of propellant body II.

The adhesive mass is applied to one of the two front faces which are to be adhered to each other in a thickness of about 2 mm. and thereafter the two propellant bodies with the adhesive mass interposed therebetween, are pressed against each other.

The tensile strength of propellant body I was determined 60 kp./cm.$^2$, and the tensile strength of propellant body II as 65 kp./cm.$^2$. After adhering the propellant bodies I and II to each other in the manner described in Examples 3, 4 and the present example, the tensile strength of the thus produced composite propellant body was tested and it was found that the composite propellant body broke within the zone of propellant body I and not within the zone of adhesion. It follows that the tensile strength within the zone of adhesion was greater than that of propellant body I.

If, however, the propellant bodies I and II were adhered to each other by interposition of a paste formed of acetone and the material of the propellant bodies, the breaking of the composite propellant body took place consistently within the zone of adhesion at about 20 kp./cm.$^2$.

The pressure-time diagram of FIG. 4 shows the pressure conditions with respect to all of the composite propellant bodies produced according to Examples 3–5 in accordance with the present invention. It will be seen that in the zone or plane of adhesion a vertical pressure drop takes place which is caused exclusively by the difference between the compositions of propellant bodies I and II and without indicating any influence of the adhesive composition on the pressure drop.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A composite solid propellant body, comprising, in combination, a plurality of solid propellant bodies located adjacent each other, each of said propellant bodies consisting essentially of at least one explosive composition based on the combination of nitrocellulose and a polyalcohol nitrate; and an adhesive material including as an essential constituent an effective amount of nitromethane interposed between and firmly adhering said propellant bodies to each other.

2. A composite solid propellant body as defined in claim 1, wherein said plurality of solid propellant bodies consists of two bodies.

3. A composite solid propellant body as defined in claim 1, wherein said polyalcohol nitrate is nitroglycerin.

4. A composite solid propellant body as defined in claim 2, wherein said two propellant bodies are of the same composition.

5. A composite solid propellant body as defined in claim 1, wherein said adhesive material is composed of a mixture of nitromethane and said explosive composition.

6. A composite solid propellant body as defined in claim 2, wherein said adhesive material is composed of a mixture of nitromethane and at least two different ones of said explosive composition.

7. A composite solid propellant body as defined in claim 2, wherein each of said two solid propellant bodies consists of a different explosive composition.

8. A composite solid propellant body as defined in claim 7, wherein said adhesive material consists of a mixture of nitromethane and said two different explosive compositions of said propellant bodies.

References Cited

FOREIGN PATENTS 16,858    7/1897    Great Britain _____ 149—14

OTHER REFERENCES

Scheer, Chem. Industries, vol. 52, pp. 473–476, 1943.

LELAND A. SEBASTIAN, Primary Examiner

U.S. Cl. X.R.

149—10, 14, 89, 97, 98; 264—3 R